(12) United States Patent
Riesmeier

(10) Patent No.: US 6,619,007 B1
(45) Date of Patent: *Sep. 16, 2003

(54) METHOD FOR PRODUCING FURNITURE BODIES AND FURNITURE BODY

(76) Inventor: Wilhelm Riesmeier, Franz-Liszt Str. 5, D-32312 Lubbecke (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,759

(22) PCT Filed: Jan. 4, 2000

(86) PCT No.: PCT/EP00/02940

§ 371 (c)(1),
(2), (4) Date: Oct. 1, 2001

(87) PCT Pub. No.: WO00/65959

PCT Pub. Date: Nov. 9, 2000

(30) Foreign Application Priority Data

Apr. 30, 1999 (DE) .......................... 199 19 851

(51) Int. Cl.[7] .............................. E04C 2/00; E04C 2/38
(52) U.S. Cl. .................. 52/631; 52/656.1; 52/656.9
(58) Field of Search .................... 52/631, 656.1, 52/656.9, 658

(56) References Cited

U.S. PATENT DOCUMENTS

| | | | | |
|---|---|---|---|---|
| 2,255,151 A | * | 9/1941 | Clements | 403/266 |
| 4,142,931 A | * | 3/1979 | Viol et al. | 156/257 |
| 4,802,936 A | * | 2/1989 | Riesmeier et al. | 156/64 |
| 4,853,058 A | * | 8/1989 | Riesmeier et al. | 156/153 |
| 5,144,737 A | * | 9/1992 | Riesmeier | 29/564.7 |
| 5,603,850 A | * | 2/1997 | Holt | 219/68 |
| 5,730,195 A | * | 3/1998 | Riesmeier et al. | 144/134.1 |
| 6,110,317 A | * | 8/2000 | Sandor | 156/235 |
| 6,258,412 B1 | * | 7/2001 | Ewing | 427/387 |
| 6,286,198 B1 | * | 9/2001 | Riesmeier | 29/525.01 |

FOREIGN PATENT DOCUMENTS

| | | | | |
|---|---|---|---|---|
| DE | 38 21 611 | * | 12/1989 | |
| DE | 43 23 408 | * | 1/1995 | |
| GB | 497288 | * | 12/1938 | 403/402 |
| JP | 10-281118 | * | 10/1998 | |

* cited by examiner

Primary Examiner—Carl D. Friedman
Assistant Examiner—Kevin McDermott
(74) Attorney, Agent, or Firm—Charles E. Baxley

(57) ABSTRACT

A process for producing structures includes: cutting a transverse groove in a panel; introducing a plastic material into the groove; applying an imprint to the panel; cutting V-shaped grooves in the panel and folding the panel to form a structure. The plastic material is initially free-flowing and subsequently solidifying. The plastic material forms a hinge which may be flush with the panel or project beyond the panel.

15 Claims, 3 Drawing Sheets

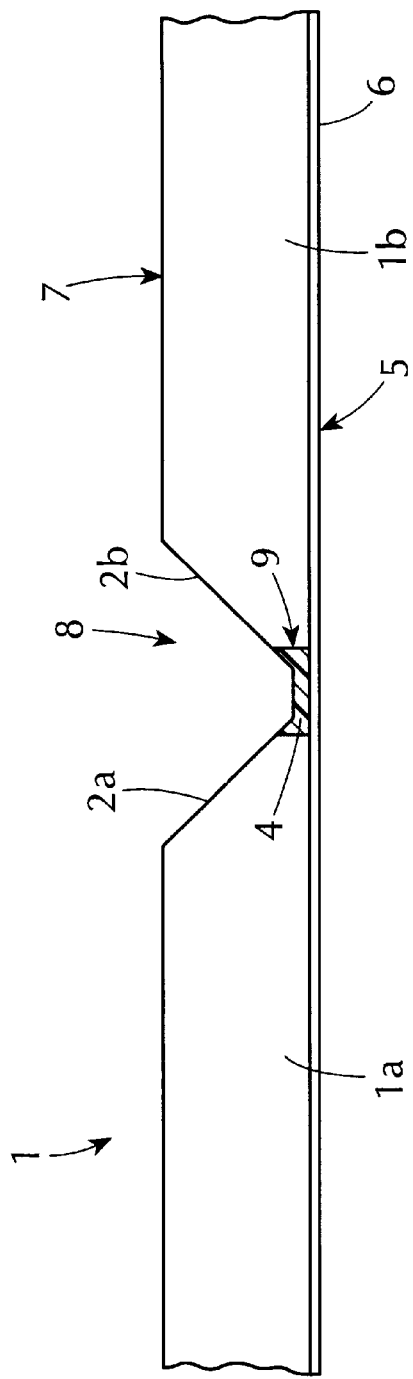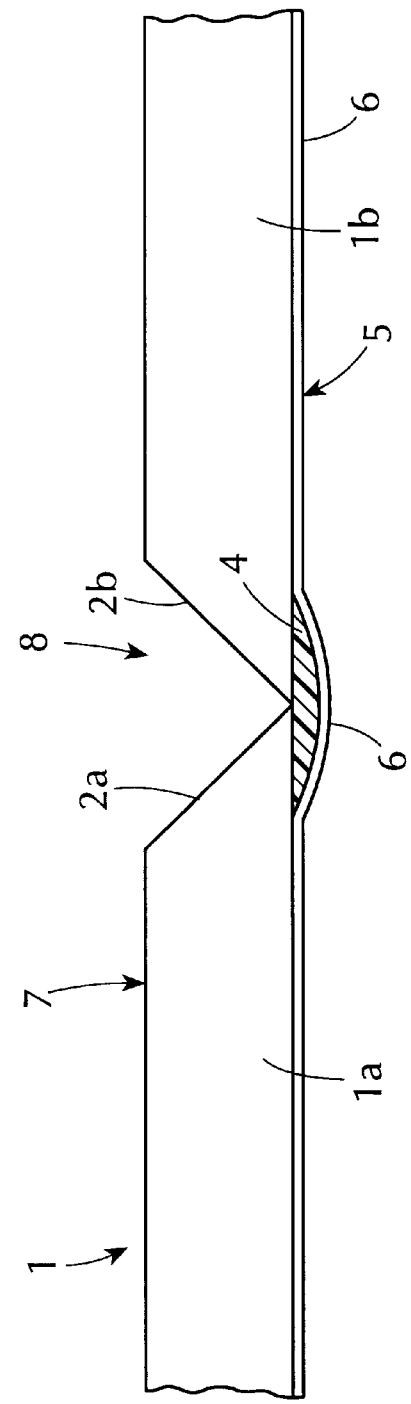

METHOD FOR PRODUCING FURNITURE BODIES AND FURNITURE BODY

FIELD OF THE INVENTION

The present invention relates generally to the field of furniture and more specifically to a process for producing basic furniture structures and basic furniture structures.

BACKGROUND OF THE INVENTION

In the process for producing furniture structures the starting workpieces used are panels which already have the respectively desired decoration on the subsequently external side. The decoration is part of a cover layer which is applied to the carrier material of the panels. Suitable for this purpose, in particular, are chipboard panels which are laminated on their outer sides with cover layers in which decoration-carrying paper is incorporated on the outer side.

It is also known for installable furniture parts, such as moldings, which likewise consist of wood or wood-like materials, to be provided with a decorative imprint. Such a process has not been envisaged up until now in the production of basic furniture structures because, up until now, the practice has been to refrain from leaving the film hinges which are necessary in basic structures for the sheet-folding process, along the basic-structure corner edges, at a subsequently visible location. Moreover, a basic furniture structure is a voluminous body which, for the purpose of being provided with printing all the way around its outer sides, involves a considerable level of outlay.

OBJECTS AND SUMMARY OF THE INVENTION

It is an object of the present invention to provide a process for producing basic furniture structures.

Another object of the present invention is to provide a basic furniture structure.

The foregoing and other objects and advantages of the invention will appear more clearly hereinafter.

In accordance with the present invention there is presented a process for providing basic furniture structures in which the starting panel, which is usually planar and processed in the flat state, may be provided with a colored print on one side or both sides more easily than a finished basic furniture structure. A film hinge, which has its outer side located in an exposed manner both on the outer side of the panel and on the outer corner edges of the basic furniture structure, has the same decoration printed over it. With the same basic color as that on the adjacent outer sides of the basic-structure sides, it is possible to conceal the presence of the film hinge. The cross-sectionally rectangular or square basic furniture structure still has to be separately joined together, and if appropriate provided with printing along its fourth corner edge, but the decorative imprint is already finished on all four basic-structure sides, and the three further corner edges, before the sheet-folding operation. In addition, the process according to the invention allows particularly straightforward storage of the starting panels, which are required just in a basic color. It is only during the production operation, namely during processing of the respective starting panel, that the respectively desired decoration is applied by printing. It is thus also possible to provide for the starting panels considerably more straightforward cover layers without incorporated decorative paper.

The invention also results in a basic furniture structure produced by the above-mentioned process.

DESCRIPTION OF THE DRAWINGS

Other important objects and advantages of the invention will be apparent from the following detailed description of the invention taken in connection with the accompanying drawings in which:

FIG. 2 shows a side view of two adjacent basic-structure sides of the basic furniture structure according to FIG. 1 before the folding operation;

FIG. 3 shows a side view, corresponding to FIG. 2 of two basic-structure sides with a different configuration of the connecting film hinge.

DETAILED DESCRIPTION OF THE INVENTION

With reference to the drawings wherein like reference numbers designate corresponding parts throughout there is shown in FIGS. 1–4 a basic furniture structure, made according to the present invention.

Figure 1:
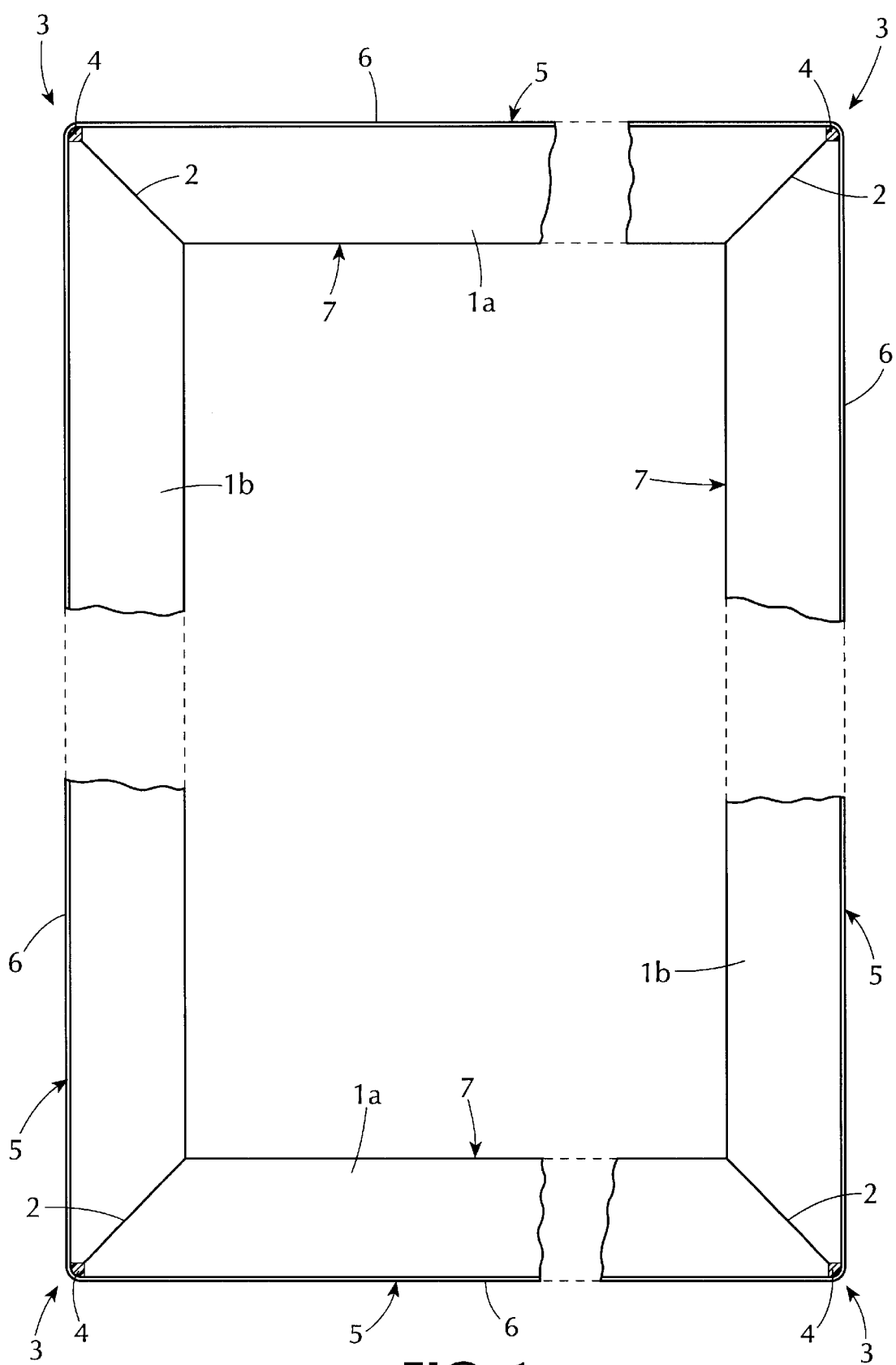
FIG. 1 shows a schematic end view of a basic furniture structure.

The basic furniture structure illustrated in FIG. 1 comprises first mutually opposite basic-structure sides 1a and second mutually opposite basic-structure sides 1b, which supplement one another to form a cross-sectionally square or rectangular basic structure. The basic-structure sides 1a and 1b are connected to one another at the corners via miters or miter surfaces 2; in this case, the miter angle is 45° in relation to the 90° angle of the adjacent basic-structure sides 1a and 1b. The basic structure has corner edges 3 running perpendicularly to the plane of the illustration, a film hinge 4 being located on three of these corner edges 3, with the film hinge consisting of an elastic material and being bent, with the result that its bent outer side provides a rounding along the respective corner edge 3. A material which is similar to, or the same as, that of the film hinges 4 is introduced in the region of the fourth corner edge 3 of the basic furniture structure in order to achieve, along this fourth corner edge 3, the same aesthetic appearance as on the other three corner edges 3.

The basic-structure sides 1a and 1b, and thus the entire basic furniture structure all the way round, have outer sides 5 which have an imprint 6 in the form of a surface decoration. This imprint 6 extends beyond the curved outer sides of the film hinges 4. With a correspondingly adapted basic color of the outer sides 5 of the basic-structure sides 1a and 1b, it is thus possible, for example, for the basic furniture structure to be given an appearance which reproduces wood coloring and texture. In this way, it is possible to imitate any desired type of wood, and any other decoration is likewise possible, as is provided, in particular, for such basic furniture structures as are used for kitchen furniture. In the same way as the outer sides 5, it is also possible, in principle, for the inner sides 7 of the basic-structure sides 1a and 1b to be coated with a colored imprint.

The basic furniture structure according to FIG. 1 is joined together by the so-called sheet-folding process, in which the four basic-structure sides are preferably formed from a single starting panel 1, a section of which is represented in FIGS. 2 and 3. At those locations at which the corner edges 3 of the finished basic furniture structure are to be formed subsequently by the folding operation, those strips of an elastically flexible material which constitute the film hinges 4 are applied to the outer side 5 of the panel 1 in the transverse direction. In the exemplary embodiment according to FIG. 2, for this purpose, first of all a groove 9 has been cut transversely into the panel 1 at the respective hinge location, from the outer side 5, and a suitable plastic material is injected or poured into said groove 9, this plastic material initially having the necessary bending properties, but being capable of solidifying fully in the long term. In the exemplary embodiment according to FIG. 3, the plastic material forming the film hinge 4 is applied to the outer side 5 of the panel 1. The plastic material thus initially projects in a somewhat raised manner, although, as a result of the expansion occurring during the subsequent folding operation, this is of secondary importance.

Once the film hinges 4 have been provided, cross-sectionally v-shaped grooves 8 are milled into the panel 1 from the inner side 7, which subsequently forms the inner sides of the basic-structure sides 1a and 1b, said grooves extending, by way of their vertex, as far as the outer side 5 of the panel 1, which subsequently forms the outer sides of the basic-structure sides 1a and 1b, or as far as the respective film hinge 4. With the finished basic furniture structure in the form of a rectangle or square, the v-angle of these grooves 8 is 90°. As a result of the cut-in v-grooves 8, the panel 1 is then already subdivided into the basic-structure sides 1a and 1b, the groove flank 2a which belongs to one basic-structure side 1a in each case, and the groove flank 2b, which belongs to the other basic-structure side 1b, forming the miter surfaces 2. During the folding operation, the respectively adjacent parts, forming the basic-structure sides 1a and 1b, of the panel 1 are pivoted through 90° the v-grooves 8 being closed in the process, whereupon the groove flanks 2a and 2b are located congruently one upon the other to form the miters 2.

Once the film hinges 4 have been provided, and before the v-grooves 8 are milled into the panel 1, a decorative imprint 6 is applied to the outer side 5 of the panel 1, said imprint extending beyond the outer sides of the film hinges 4, with the result that the outer sides of the film hinges 4 are thus provided with printing in the same way as the outer side 5 of the panel 1.

Figure 4:
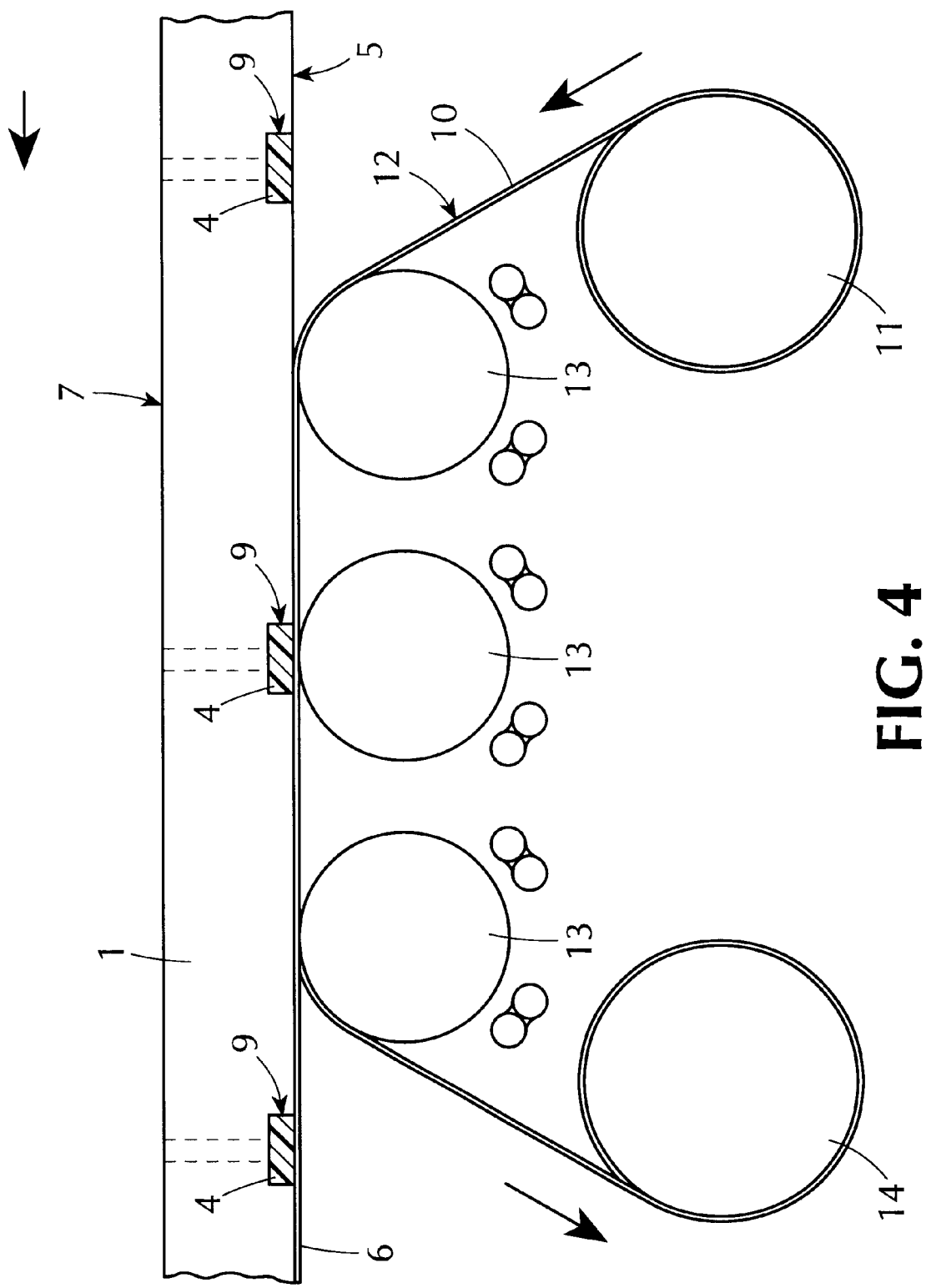
FIG. 4 shows a schematic side view of a processing station for the starting panel, which forms the sides of the basic structure according to FIG. 1 in which a colored imprint is applied.

The specific way in which this is done is shown in FIG. 4. The panel 1 is preferably guided continuously past a station at which it has a stamping sheet 10 temporarily laid beneath it. The stamping sheet 10 is drawn off from a supply roll 11 and, on the side which comes into contact with the panel 1, bears a color coating 12 which, as is illustrated in FIG. 4, is applied to the outer side 5 of the panel 1 over and beyond the outer sides of the film hinges 4. It is also possible, in principle, for the inner side 7 of the panel 1 to be coated in the same way. The color coating 12 consequently forms, on the outer side 5, the continuous uninterrupted decorative imprint 6 extending beyond the outer sides of the film hinges 4. Pressure-exerting rollers 13 are used to press the stamping sheet, which runs along synchronously with the panel 1, onto the outer side 5, and the used-up stamping sheet 10, which has transferred its color coating 12, is wound up on a reel 14. It is thus only once the film hinges 4 have been provided that the panel 1 is surface-finished by transfer of the decorative color coating 12, before the v-grooves 8 are milled in, and the folding operation is then carried out in order to form the finished basic furniture structure.

The foregoing specific embodiments of the present invention as set forth in the specification herein are for illustrative purposes only. Various deviations and modifications may be made within the spirit and scope of this invention without departing from the main theme thereof.

What is claimed is:

1. A process for producing furniture structures comprising the steps of:

providing a flat panel having an outer side and an inner side;

cutting a transverse groove into the panel from said outer side;

introducing a plastic material into said transverse groove so as to form a film hinge having an outer side;

applying an imprint to said outer side of said panel and to said outer side of said film hinge while said panel is still flat so as to form a continuous uninterrupted imprint on said outer side of said panel and said outer side of said film hinge while said panel is still flat;

cutting cross-sectionally v-shaped grooves into said starting panel from said inner side with said groove having a vertex extending to said outer side of said panel; and folding said panel to close said v-shaped grooves.

2. The process for producing furniture structures as claimed in claim 1 following said step of applying an imprint to said outer side further comprising the step of:

applying an imprint to said inner side of said panel.

3. The process for producing furniture structures as claimed in claim 1 in which said step of applying an imprint to said outer side comprises:

applying a decorative imprint to said outer side.

4. The process for producing furniture structures as claimed in claim 1 in which said flat panel further comprises a colored cover layer disposed on said outer side.

5. The process for producing furniture structures as claimed in claim 1 in which said flat panel further comprises a colored cover layer disposed on said inner side.

6. The process for producing furniture structures as claimed in claim 1 in which said plastic material comprises: free-flowing subsequently solidifying material.

7. The process for producing furniture structures as claimed in claim 1 in which said step of applying an imprint to said outer side further comprises the steps of:

providing a stamping sheet having a color coating; and transferring said color coating from said stamping sheet to said outer side.

8. The process for producing furniture structures as claimed in claim 1 in which said step of applying an imprint to said outer side further comprises the steps of:

providing a stamping sheet having a color coating; and transferring said color coating from said stamping sheet to said inner side.

9. The process for producing furniture structures as claimed in claim 1 in which said step of introducing a plastic material further comprises the step of:

injecting a plastic material into said transverse groove.

10. The process for producing furniture structures as claimed in claim 1 in which said step of introducing a plastic material further comprises the step of:

pouring a plastic material into said transverse groove.

11. The process for producing furniture structures as claimed in claim 1 in which said step of introducing a plastic material into said transverse groove further comprises:

introducing said plastic material into said transverse groove with said plastic material disposed flush with said outer side of said panel.

12. The process for producing furniture structures as claimed in claim 11 in which said step of introducing a plastic material into said transverse groove further comprises:

introducing said plastic material into said transverse groove with said plastic material disposed projecting beyond said outer side of said panel.

13. A basic furniture structure comprising:

at least two side members, with said side members each having an outer surface, with said side members each having a miter surface and with said side members disposed adjoined one another via said miter surfaces thereby forming a corner edge;

a film hinge disposed extending along said corner edge, with said film hinge disposed bent around said corner edge, and with said film hinge having an outer surface; and an imprint covering said outer surfaces of said side members and covering said outer surface of said film hinge so as to form a continuous uninterrupted imprint on said outer surfaces of said side members and said outer surface of said film hinge.

14. The basic furniture structure as claimed in claim 13 wherein said film hinge is disposed in a surface-flush manner relative to said outer surfaces of said first and said second side members.

15. The basic furniture structure as claimed in claim 13 wherein said film hinge is disposed in a raised manner relative to said first and said second side members.

* * * * *